United States Patent
Saitou et al.

(10) Patent No.: US 6,889,130 B2
(45) Date of Patent: May 3, 2005

(54) SHIFT CONTROL SYSTEM FOR AUTOMATIC TRANSMISSION

(75) Inventors: Yuuji Saitou, Shizuoka (JP); Takashi Murasugi, Shizuoka (JP); Takashi Sano, Shizuoka (JP); Ikuo Hirose, Shizuoka (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 10/489,959

(22) PCT Filed: Sep. 27, 2002

(86) PCT No.: PCT/JP02/10060

§ 371 (c)(1),
(2), (4) Date: Mar. 18, 2004

(87) PCT Pub. No.: WO03/029698

PCT Pub. Date: Apr. 10, 2003

(65) Prior Publication Data

US 2004/0249540 A1 Dec. 9, 2004

(30) Foreign Application Priority Data

Sep. 28, 2001 (JP) ........................................ 2001-302945

(51) Int. Cl.[7] .............................................. F16H 61/26
(52) U.S. Cl. .............................. 701/51; 701/52; 701/55
(58) Field of Search .............................. 701/51, 52, 55, 701/64, 78, 95; 477/34, 120, 155, 153, 156, 143, 158, 162; 475/116, 120, 121

(56) References Cited

U.S. PATENT DOCUMENTS

| 5,043,894 | A | | 8/1991 | Yamaguchi |
| 5,527,236 | A | | 6/1996 | Kimura et al. |
| 6,520,882 | B2 | * | 2/2003 | Saito ........................... 475/127 |
| 6,577,940 | B2 | * | 6/2003 | Saito et al. .................... 701/59 |
| 6,584,394 | B2 | * | 6/2003 | Takatori et al. ................ 701/55 |
| 6,623,404 | B2 | * | 9/2003 | Saito ........................... 477/143 |
| 6,638,196 | B2 | * | 10/2003 | Murasugi et al. ............ 477/156 |

FOREIGN PATENT DOCUMENTS

| JP | 2-14933 A | 1/1990 |
| JP | 5-99004 A | 4/1993 |
| JP | 7-139382 A | 5/1995 |
| JP | 7-247873 A | 9/1995 |
| JP | 10-184410 A | 7/1998 |
| JP | 10-196776 A | 7/1998 |

OTHER PUBLICATIONS

U.S. Appl. No. 10/489,957, filed Mar. 18, 2004, Saitou et al.
U.S. Appl. No. 10/490,161, filed Mar. 18, 2004, Inuta.
U.S. Appl. No. 10/489,958, filed Mar. 18, 2004, Saitou.

* cited by examiner

*Primary Examiner*—Richard M. Camby
(74) *Attorney, Agent, or Firm*—Foley & Lardner LLP

(57) ABSTRACT

In a shift control system for an automatic transmission, shelf-pressure control means include means for increasing the engagement pressure of the friction elements at a first gradient as previously set after output of the shift command, wherein after output of the shift command and when start of the inertia phase is detected, a torque-reduction command is output to the torque-reduction control means, the engagement pressure at detection of the inertia phase is set as an initial shelf pressure to increase the shelf pressure at a second gradient set for each speed, and a torque variation part oil pressure is added only when detecting a variation in throttle opening, and wherein after start of the inertia phase and when completion of the inertia phase is detected, a torque-reduction completion command is output to the torque-reduction control means.

With this, the shelf pressure can be set appropriately during inertia phase without needing an enormous data amount even if a variation in throttle opening is present.

7 Claims, 7 Drawing Sheets

|  | LOW/C | 3-5R/C | H/C | L&R/B | 2-6/B | LOW/OWC |
|---|---|---|---|---|---|---|
| 1ST | ○ |  |  | ⊗ |  | ◐ |
| 2ND | ○ |  |  |  | ○ |  |
| 3RD | ○ | ○ |  |  |  |  |
| 4TH | ○ |  | ○ |  |  |  |
| 5TH |  | ○ | ○ |  |  |  |
| 6TH |  |  | ○ |  | ○ |  |
| REV |  | ○ |  | ○ |  |  |

⊗ : ENGINE BRAKE

SHIFT CONTROL SYSTEM FOR AUTOMATIC TRANSMISSION

TECHNICAL FIELD

The present invention relates to a shift control system for an automatic transmission having a circuit structure which can freely control, during upshift, the engagement pressure to friction elements involved in shifting of the automatic transmission.

BACKGROUND ART

Conventionally, there is known a shift control system for an automatic transmission as described, for example, in a gazette JP-A 2-14933. This gazette describes a technique for determining the engagement pressure of engagement-side friction elements based on the throttle opening. With this, the engagement pressure is determined with respect to driver's acceleration/deceleration requirement, achieving smooth shifting. Moreover, in the prior art as disclosed in a gazette JP-A 5-99004, it is described a technique for determining the engagement pressure with the throttle opening fixed during inertia phase.

Now, an explanation is made about requirements to be achieved when carrying out torque-reduction control during upshift with the engine being in the normally driving state, i.e. in the drive state so called.

(Requirement 1) First, shift-control start determination is made so that the engagement-side oil pressure starts to increase. When the engagement-side friction elements start to transmit torque, torque phase is started to decrease output-shaft torque. Then, when transmission torque to the engagement-side friction elements which increases continuously exceeds to torque corresponding to input torque, the inertial phase so called is started where input rotation is increased. In the inertia phase, engine rotation and the like are lowered, so that inertia constituents are released into output-shaft torque, resulting in an increase in output-shaft torque. As for the shape of output-shaft torque at this time, in terms of physical feel, the difference is preferably minimized between output-shaft torque when torque is reduced maximally in torque phase and output-shaft torque after starting the inertia phase.

(Requirement 2) Likewise, as for output-shaft torque at completion of the inertia phase, in terms of physical feel, the difference is preferably minimized between output-shaft torque immediately before completing the inertia phase, which is determined by the height of the engagement-side shelf pressure, and output-shaft torque immediately after completing the inertia phase, which is determined by input torque and the gear ratio at completion of the inertia phase.

(Requirement 3) Output-shaft torque during inertia phase is preferably varied in accordance with the throttle opening corresponding to a driver's intention. This means that if the throttle opening is constant, driver's acceleration/deceleration requirement is not provided, so that output-shaft torque is preferably as nearly constant as possible within the range of failing to interfere with other tasks, whereas in the throttle opening is varied, driver's acceleration/deceleration requirement is provided, output-shaft torque is preferably varied in accordance with variations in engine torque which varies in correspondence with that requirement.

Using the technique described in the gazette JP-A 2-14933, for example, to meet the above requirements, the requirement 3 can be satisfied. However, if the engine speed is different, input torque after completing the inertia phase is different even with the same throttle opening. This renders impossible control of the relationship with output-shaft torque immediately before completing the inertia phase, which is determined by the shelf pressure determined in accordance with the throttle opening, so that the requirements 1 and 2 cannot be satisfied.

Further, when supposing determination of the engagement pressure based on input torque, the requirements 1 and 2 can be satisfied. However, turbine rotation is decreased during inertia phase, in accordance with which input torque is increased. Thus, even when the throttle opening is constant, and the driver has no intention to carry out acceleration or deceleration, the engagement-side oil pressure is increased, which results in an increase in output-shaft torque, leading to impossible achievement of an object that "if the throttle is constant, output-shaft torque is preferably as nearly constant as possible within the range of failing to interfere with other tasks".

Furthermore, using the technique described in the gazette JP-A 5-99004, the throttle opening is kept constant, so that the requirement 3 cannot be satisfied in like manner.

DISCLOSURE OF THE INVENTION

The present invention is made in view of the above problems and requirements, and aims to provide a shift control system for an automatic transmission for carrying out torque-reduction control during upshift, wherein the shelf pressure can be set appropriately during inertia phase without needing an enormous data amount even if a variation in throttle opening is present.

In order to achieve the above object, the invention in claim 1 is directed to a shift control system for an automatic transmission provided with shift control means for carrying out shifting by engaging at least one or more friction elements as released when the relationship between a throttle opening of a vehicle and a vehicle speed intersects a shift line of a shift schedule, and torque-reduction control means for temporarily educing engine torque during a period of shift transition, characterized in that it comprises shift-command determination means for determining whether or not a shift command is output, inertia-phase detection means for detecting start and completion of an inertia phase, and shelf-pressure control means for controlling an engagement pressure of said friction elements, wherein said shelf-pressure control means include means for increasing the engagement pressure of said friction elements at a first gradient as previously set after output of the shift command, wherein after output of the shift command and when start of the inertia phase is detected by said inertia-phase detection means, a torque-reduction command is output to said torque-reduction control means, and the engagement pressure at detection of the inertia phase is set as an initial shelf pressure to increase the shelf pressure at a second gradient as previously set, and wherein after start of the inertia phase and when completion of the inertia phase is detected by said inertia-phase detection means, a torque-reduction completion command is output to said torque-reduction control means, and the engagement pressure of said friction elements is increased up to a predetermined pressure as previously set.

With shift control system for an automatic transmission as described in claim 1, the shelf-pressure control means increase the engagement pressure of the friction elements at the first gradient as previously set after output of the shift command. After output of the shift command and when start of the inertia phase is detected by the inertia-phase detection means, a torque-reduction command is output to the torque-reduction control means, and the engagement pressure at detection of the inertia phase is set as an initial shelf pressure, thus allowing setting of the shelf pressure which can reduce the difference between output-shaft torque at a point that torque is maximally reduced in the torque phase and output-shaft torque after starting the inertia phase while securing progression of the inertia phase through a torque reduction, achieving a restraint of a thrusting shock and the like.

Further, like the invention as described in claim 2, the shift control system for an automatic transmission as specified in claim 1 may be constructed so that said second gradient is determined out of at least transmission input torque and revolution constituent at start of the inertia phase.

With the shift control system for an automatic transmission as specified in claim 2, the shelf pressure is increased at the second gradient as previously set. After start of the inertia phase and when completion of the inertia phase is detected by the inertia-phase detection means, a torque-reduction completion command is output to the torque-reduction control means, and the shelf pressure of the friction elements is controlled at an ideal value. Moreover, the height of the oil pressure at completion of the inertia phase can be controlled by the magnitude of the second gradient set by at least input torque at start of the inertia phase, type of shifting, and revolution constituent. Therefore, the difference can be reduced between output-shaft torque determined by the height of the engagement-side shelf pressure immediately before competing the inertia phase and output-shaft torque immediately after completing the inertia phase, achieving a restraint of occurrence of a shock due to an abrupt reduction in output-shaft torque.

The invention as described in claim 3 is directed to the shift control system for an automatic transmission as specified in claim 1 or 2, characterized in that it comprises throttle-opening detection means for detecting the throttle opening, and throttle-opening variation determination means for determining that the throttle opening varies when the detected throttle opening is increased or decreased by a predetermined value or more with respect to the throttle opening at a predetermined timing after shift start determination, wherein said shelf-pressure control means are provided with an input-torque variation correction part for adding/subtracting a predetermined oil pressure to/from the shelf pressure when the throttle opening is varied by the throttle-opening variation determination means.

With the shift control system for an automatic transmission as specified in claim 3, in the input-torque variation correction part arranged in the shelf-pressure control means, when the throttle-opening variation determination means determine that a variation in throttle opening is present, a variation part of input torque is added to the shelf pressure to restrain a variation in output-shaft torque during inertia phase if the throttle opening is constant. When a variation in input torque occurs by a driver's acceleration/deceleration requirement even during inertia phase, the variation can be reflected on output-shaft torque, and thus a driver's acceleration/deceleration requirement can be reflected on output-shaft torque.

The invention as described in claim 4 is directed to the shift control system for an automatic transmission as specified in claim 3, characterized in that the predetermined oil pressure added/subtracted by said input-torque variation correction part is an oil pressure set in accordance with a variation part of input torque at a present point with respect to input torque of the automatic transmission at a point that the initial shelf pressure of the engagement pressure is determined.

With the shift control system for an automatic transmission as specified in claim 4, since an increasing part with respect to input torque at start of the inertia phase is further added or subtracted as a torque variation part oil pressure, the difference can surely be reduced between output-shaft torque immediately before completing the inertia phase and output-shaft torque immediately after completing the inertia phase while reflecting a driver's acceleration/deceleration requirement on output-shaft torque.

The invention as described in claim 5 is directed to the shift control system for an automatic transmission as specified in claim 3 or 4, characterized in that the predetermined amount of a throttle variation is set so that the increasing side has a smaller value than the decreasing side.

With the shift control system for an automatic transmission as specified in claim 5, unless the throttle opening varies by a predetermined amount as set previously on the increasing side or on the decreasing side with respect to the throttle opening at start of the inertia phase, it is determined that driver's unintentional depression or foot release occurs, and that the throttle opening does not vary, allowing prevention of occurrence of a shock due to driver's unintentional depression or foot release. And the predetermined value is set so that the increasing-side value is smaller than the decreasing-side value, allowing sure prevention of zooming of engine rotation or impossible attainment of the gear ratio due to delay of increasing the oil pressure.

BEST MODE FOR CARRYING OUT THE INVENTION

Based on the drawings, an explanation is made hereafter about the best mode for achieving the shift control system for an automatic transmission according to the present invention.

First Embodiment

Figure 1:
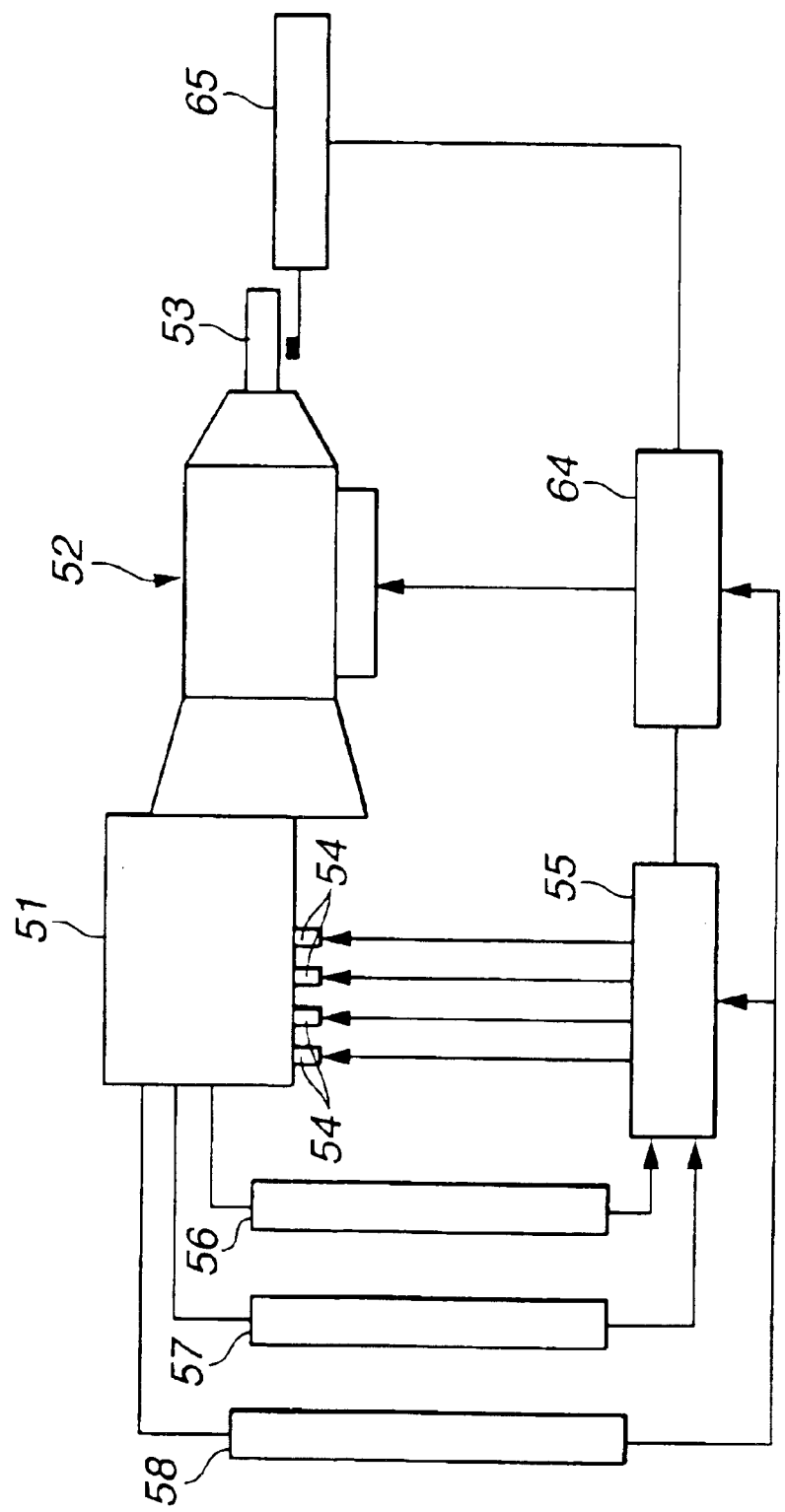
FIG. 1 is a general system diagram of a vehicle to which a shift control system in a first embodiment is applied.

FIG. 1 is a system diagram showing a torque-reduction control system, wherein 51 denotes an engine as a prime mover, and 52 denotes an automatic transmission. Output torque of the engine 51 is input to the automatic transmission 52 which transfers its output torque to an output shaft 53 at the gear ratio in response to the selected speed, achieving running of the vehicle.

The engine 51 includes a plurality of injectors 54 for injecting fuel. Fuel injection of each injector 54 is carried out through an engine control unit 55.

The engine control unit 55 inputs essentially a signal out of an engine-speed sensor 56 for sensing an engine speed Ne, a signal out of a coolant-temperature sensor 57 for sensing an engine-coolant temperature, and a signal out of a throttle-opening sensor 58 for sensing a throttle opening TVO corresponding to an engine load to compute a fuel injection amount, then actuates the injectors 54 separately in accordance with engine rotation by a time corresponding to the amount. It is constructed to stop actuation of ones of the injectors 54 for injecting fuel into some cylinders as required to allow a reduction in engine output torque.

Specifically, the injectors 54 and the engine control unit 55 correspond to torque changing means described in claims. In connection with the torque changing means, torque-reduction control may be carried out through retard for changing ignition timing or electronic throttle control for changing the throttle opening by using the electronic throttle opening.

The automatic transmission 52 includes a control valve 59 for controlling shift by supplying the oil pressure or stopping its supply to an actuator for engaging or releasing friction elements as will be described later. Actuation of the control valve 59 is carried out through a shift control unit 64. The shift control unit 64 outputs a signal for reducing torque to the engine control unit 55 during shifting, ensuring an improvement in shift quality and in reliability of durability of the friction elements pertinent to shifting.

Figures 2, 3:
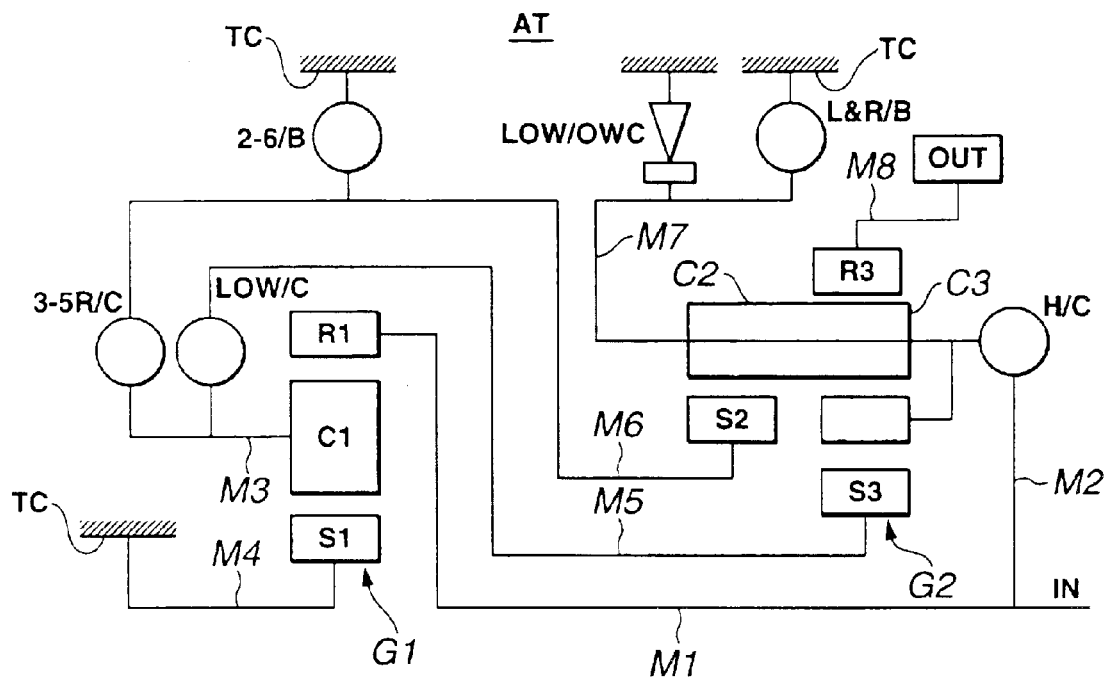
FIG. 2 is a skeleton diagram showing a gear train of an automatic transmission with 6 forward speeds and 1 reverse speed to which the shift control system for an automatic transmission in the first embodiment is applied.
FIG. 3 is a drawing showing an operation table of friction elements under shift control of the shift control system for an automatic transmission in the first embodiment is applied.

FIG. 2 is a skeleton diagram showing a gear train of the automatic transmission 52 with 6 forward speeds and 1 reverse speed in a first embodiment. The automatic transmission 52 uses as a gear train a combination of a simple planetary-gear set G1 and a Ravigneaux-type compound planetary-gear set G2. The simple planetary-gear set G1 comprises a first sun gear S1, a first carrier C1, and a first ring gear R1. The Ravigneaux-type compound planetary-gear set G2 comprises a second sun gear S2, a second carrier C2, a second ring gear R2, a third sun gear S3, a third carrier C3, and a third ring gear R3.

An input shaft IN, to which engine tractive force is input via the engine 51 and a torque converter, is coupled to the first ring gear R1 directly through a first member M1, and also to the third carrier C3 through a second member M2 and a high clutch H/C.

The first carrier C1 is coupled to the third sun gear S3 through a third member M3, a low clutch LOW/C, and a fifth member M5, and also to the second sun gear S2 through the third member M3, a 3–5 reverse clutch 3–5R/C, and a sixth member M6. The sixth member M6 is fixed to a transmission casing TC through a 2–6 brake 2–6/B.

The first sun gear S1 is fixed to the transmission casing TC through a fourth member M4. The second carried C2 is fixed to the transmission casing TC through a seventh member M7, a low & reverse brake L&R/B disposed in parallel, and a low one-way clutch LOW/OWC. The third ring gear R3 is coupled to an output gear OUT through an eighth member M8.

The automatic transmission 52 ensures automatic shift control of 6 forward speeds based on an operation point determined out of the vehicle velocity and the throttle opening and a shift schedule in the D-range position, and shift control of 1 reverse speed through select operation from the D-range position to the R-range position. FIG. 3 shows an operation table of the friction elements in this shift control. In FIG. 3, a circular mark denotes engagement, no mark denotes release, a circular mark with X denotes engagement which occurs during engine brake, a hatched circular mark denotes mechanical actuation during engine driving.

First speed (1ST) is achieved by engagement of the low clutch LOW/C and the low & reverse brake L&R/B. In this case, rotation reduced through the input shaft IN and the first member M1 and via the simple planetary-gear set G1 is input to the third sun gear S3 through the third member M3, the low clutch LOW/C, and the fifth member M5. The third ring gear R3 produces reduced rotation while undergoing a reactive force from the second carrier C2 fixed to the transmission casing TC by engagement of the low one-way clutch LOW/OWC, so that the output gear OUT outputs reduced rotation at the maximum reduction ratio through the eighth member M8.

During engine brake, the low & reverse brake L&R/B undergoes a reactive force in place of the low one-way clutch LOW/OWC.

Second speed (2ND) is achieved by engagement of the low clutch LOW/C and the 2–6 brake 2–6/B. In this case, rotation reduced through the input shaft IN and the first member M1 and via the simple planetary-gear set G1 is input to the third sun gear S3 through the third member M3, the low clutch LOW/C, and the fifth member M5. The third ring gear R3 produces reduced rotation while undergoing a reactive force from the second sun gear S2 fixed to the transmission casing TC by engagement of the 2–6 brake 2–6/B, so that the output gear OUT outputs reduced rotation at a smaller reduction ratio than that of the first speed through the eighth member M8.

Third speed (3RD) is achieved by engagement of the low clutch LOW/C and the 3–5 reverse clutch 3–5R/C. In this case, rotation reduced through the input shaft IN and the first member M1 and via the simple planetary-gear set G1 is input to the third sun gear S3 through the third member M3, the low clutch LOW/C, and the fifth member M5, and to the second sun gear S2 through the third member M3, the 3–5 reverse clutch 3–5R/C, and the sixth member M6. Since the Ravigneaux-type compound planetary-gear set G2 becomes in the directly coupled state, the third ring gear R3 is rotated in the same rotation as the two sun gears S2, S3, so that the output gear OUT outputs reduced rotation at a smaller reduction ratio than that of the second speed through the eighth member M8.

Fourth speed (4TH) is achieved by engagement of the low clutch LOW/C and the high clutch H/C. In this case, on the one hand, rotation reduced through the input shaft IN and the first member M1 and via the simple planetary-gear set G1 is input to the second sun gear S2 through the third member M3, the 3–5 reverse clutch 3–5R/C, and the sixth member M6. On the other hand, the same rotation as that of the input shaft IN is input to the third carrier C3 through the input shaft IN, the second member M2, and the high clutch H/C. The third ring gear R3 is rotated by rotation between the two input rotations, so that the output gear OUT outputs slightly reduced rotation with respect to input rotation through the eighth member M8.

Fifth speed (5TH) is achieved by engagement of the 3–5 reverse clutch 3–5R/C and the high clutch H/C. In this case, on the one hand, rotation reduced through the input shaft IN and the first member M1 and via the simple planetary-gear set G1 is input to the second sun gear S2 through the third member M3, the 3–5 reverse clutch 3–5R/C, and the sixth member M6. On the other hand, the same rotation as that of the input shaft IN is input to the third carrier C3 through the input shaft IN, the second member M2, and the high clutch H/C. The third ring gear R3 is restrained and rotated by the two input rotations, so that the output gear OUT outputs slightly increased rotation with respect to input rotation through the eighth member M8.

Sixth speed (6TH) is achieved by engagement of the high clutch H/C and the 2–6 brake 2–6/B. In this case, the same rotation as that of the input shaft IN is input to the third carrier C3 only through the input shaft IN, the second member M2, and the high clutch H/C. The third ring gear R3 produces increased rotation while undergoing a reactive force from the second sun gear S2 fixed to the transmission casing TC by engagement of the 2–6 brake 2–6/B, so that the output gear OUT outputs further increased rotation with respect to rotation at the fifth speed through the eighth member M8.

Reverse speed (REV) is achieved by engagement of the 3–5 reverse cutch 3–5/R/C and the low & reverse brake L&R/B. In this case, rotation reduced through the input shaft IN and the first member M1 and via the simple planetary-gear set G1 is input to the second sun gear S2 through the third member M3, the 3–5 reverse clutch 3–5R/C, and the sixth member M6. The third ring gear R3 produces reverse rotation while undergoing a reactive force from the second carrier C2 fixed to the transmission casing TC by engagement of the low & reverse brake L&R/B, so that the output gear OUT outputs reduced reverse rotation through the eighth member M8.

Figure 4:
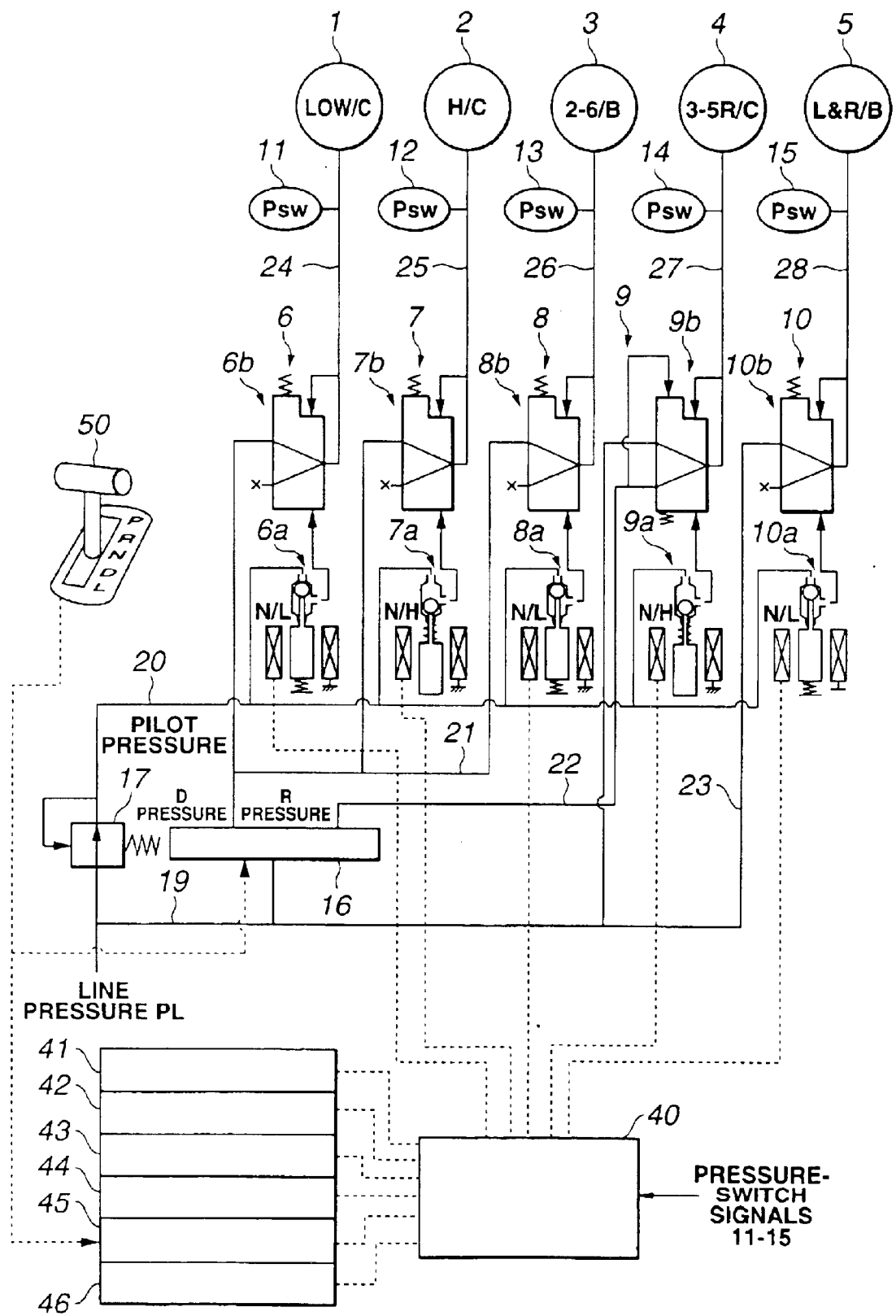
FIG. 4 is a diagram showing a hydraulic circuit and an electronic shift control system in the shift control system for an automatic transmission in the first embodiment.

Next, with reference to FIG. 4, the structure is explained about a hydraulic circuit and an electronic shift control system which achieve the above shift control. In FIG. 4, 1 is an engagement piston chamber of the low clutch LOW/C, 2 is an engagement piston chamber of the high clutch H/C, 3 is an engagement piston chamber of the 2–6 brake 2–6/B, 4 is an engagement piston chamber of the 3–5 reverse clutch 3–5R/C, and 5 is an engagement piston chamber of the low & reverse brake L&R/B. The low clutch LOW/C, the high clutch H/C, the 2–6 brake 2–6/B, the 3–5 reverse brake 3–5R/C, and the low & reverse brake L&R/B are engaged by supplying to the engagement piston chambers 1–5 the engagement pressure which is in the form of D-range pressure or R-range pressure, respectively. And they are released by removing the engagement pressure.

The D-range pressure is a line pressure through a manual valve 16, and occurs only when selecting the D range. The R-range pressure is a line pressure through the manual valve 16, and occurs only when selecting the R range. At a range other than the R range, no oil pressure occurs due to connection to a drain port.

In FIG. 4, 6 is a first hydraulic control valve for controlling the engagement pressure to the low clutch LOW/C, 7 is a second hydraulic control valve for controlling the engagement pressure to the high clutch H/C, 8 is a third hydraulic control valve for controlling the engagement pressure to the 2–6 brake 2–6/B, 9 is a fourth hydraulic control valve for controlling the engagement pressure to the 3–5 reverse clutch 3–5R/C, and 10 is a fifth hydraulic control valve for controlling the engagement pressure to the low & reverse brake L&B.

The first hydraulic control valve 6 comprises a first duty solenoid 6a for creating the shift control pressure using the pilot pressure as source pressure and by dint of a solenoid force, and a first pressure regulating valve 6b for regulating the low-clutch pressure using the D-range pressure as source pressure and the shift control pressure and feedback pressure as operation signal pressure. The first duty solenoid 6a puts the low-clutch pressure zero when the solenoid is turned off, and increases the low-clutch pressure with increase in ON duty ratio when the solenoid is turned on.

The second hydraulic control valve 7 comprises a second duty solenoid 7a for creating the shift control pressure using the pilot pressure as source pressure and by dint of a solenoid force, and a second pressure regulating valve 7b for regulating the high-clutch pressure using the D-range pressure as source pressure and the shift control pressure and feedback pressure as operation signal pressure. The second duty solenoid 7a puts the high-clutch pressure zero when the solenoid is turned on (100% ON duty ratio), increases the high-clutch pressure with decrease in ON duty ratio, and puts the high-clutch pressure at a maximum pressure when the solenoid is turned off.

The third hydraulic control valve 8 comprises a third duty solenoid 8a for creating the shift control pressure using the pilot pressure as source pressure and by dint of a solenoid force, and a third pressure regulating valve 8b for regulating the 2–6 brake pressure using the D-range pressure as source pressure and the shift control pressure and feedback pressure as operation signal pressure. The third duty solenoid 8a puts the 2–6 brake pressure zero when the solenoid is turned off, and increases the 2–6 brake pressure with increase in ON duty ratio.

The fourth hydraulic control valve 9 comprises a fourth duty solenoid 9a for creating the shift control pressure using the pilot pressure as source pressure and by dint of a solenoid force, and a fourth pressure regulating valve 9b for regulating the 3–5 reverse-clutch pressure using the line pressure as source pressure and the shift control pressure and R-range pressure as operation signal pressure. The fourth duty solenoid 9a puts the 3–5 reverse-clutch pressure zero when the solenoid is turned on (100% ON duty ratio), increases the 3–5 reverse-clutch pressure with decrease in ON duty ratio, and puts the 3–5 reverse-clutch pressure at a maximum pressure when the solenoid is turned off.

The fifth hydraulic control valve 10 comprises a fifth duty solenoid 10a for creating the shift control pressure using the pilot pressure as source pressure and by dint of a solenoid force, and a fifth pressure regulating valve 10b for regulating the low & reverse brake pressure using the D-range pressure or the R-range pressure as source pressure and the shift control pressure and feedback pressure as operation signal pressure. The fifth duty solenoid 10a puts the low & reverse brake pressure zero when the solenoid is turned off, and increases the low & reverse brake pressure with increase in ON duty ratio.

In FIG. 4, 11 is a first pressure switch (oil-pressure detecting means), 12 is a second pressure switch (oil-pressure detecting means), 13 is a third pressure switch (oil-pressure detecting means), 14 is a fourth pressure switch (oil-pressure detecting means), 15 is a fifth pressure switch (oil-pressure detecting means), 16 is manual valve, 17 is a pilot valve, 19 is a line-pressure passage, 20 is a pilot-pressure passage, 21 is a D-range pressure passage, 22 is an R-range pressure passage, 23 is a D & R range pressure passage, 24 is a low-clutch pressure passage, 25 is a high-clutch pressure passage, 26 is a 2–6 brake-pressure passage, 27 is a 3–5 reverse-clutch pressure passage, and 28 is a low & reverse brake-pressure passage.

Specifically, the low-clutch pressure passage 24, the high-clutch pressure passage 25, the 2–6 brake-pressure passage 26, the 3–5 reverse-clutch pressure passage 27, and the low & reverse brake-pressure passage 28 are provided with the first to fifth pressure switches 11–15 for detecting the presence or absence of the engagement pressure through a switch signal (ON when the engagement-pressure is present, and OFF when the engagement pressure is absent), respectively.

In FIG. 4, 40 is an A/T control unit (shift control means), and 50 is a shift lever. The shift lever 50 has ranges such as P range where a transmission output shaft is locked at stop of the vehicle, R range where the reverse speed is achieved, N range where the neutral state is achieved which shows a state that forward or backward movement is possible without outputting torque input from the engine, D range where the forward speeds are achieved, and engine-brake range where the low & reverse brake L&R/B is controlled for engagement at the first speed. The shift lever 50 is coupled to the manual valve 16, wherein driver's operation of shift lever 50 causes switching of the position of the manual valve 16, achieving a target shift state.

In the drawing, 41 is a vehicle-velocity sensor (transmission output-shaft revolution sensor), 42 is a throttle sensor for sensing the throttle opening, 43 is an engine-speed sensor for sensing the engine speed, 44 is a turbine-revolution sensor (transmission input-shaft revolution sensor) for sensing the turbine revolution, 45 is an inhibitor switch for detecting the range position of the shift lever 50, and 46 is an oil-temperature sensor for sensing the oil temperature in the transmission, which constitute the electronic shift control system. The A/T control unit 40 inputs switch signals out of the pressure switches 11, 12, 13, 14, 15 and signals out of the sensors/switch 41, 42, 43, 44, 45, 46 to carry out processing based on such input information, preset shift control formula and fail-safe control formula and the like. In accordance with the processing results, solenoid drive signals are output to the first duty solenoid 6a, the second duty solenoid 7a, the third duty solenoid 8a, the fourth duty solenoid 9a, and the fifth duty solenoid 10a.

Next, operation is explained.

Figure 5:
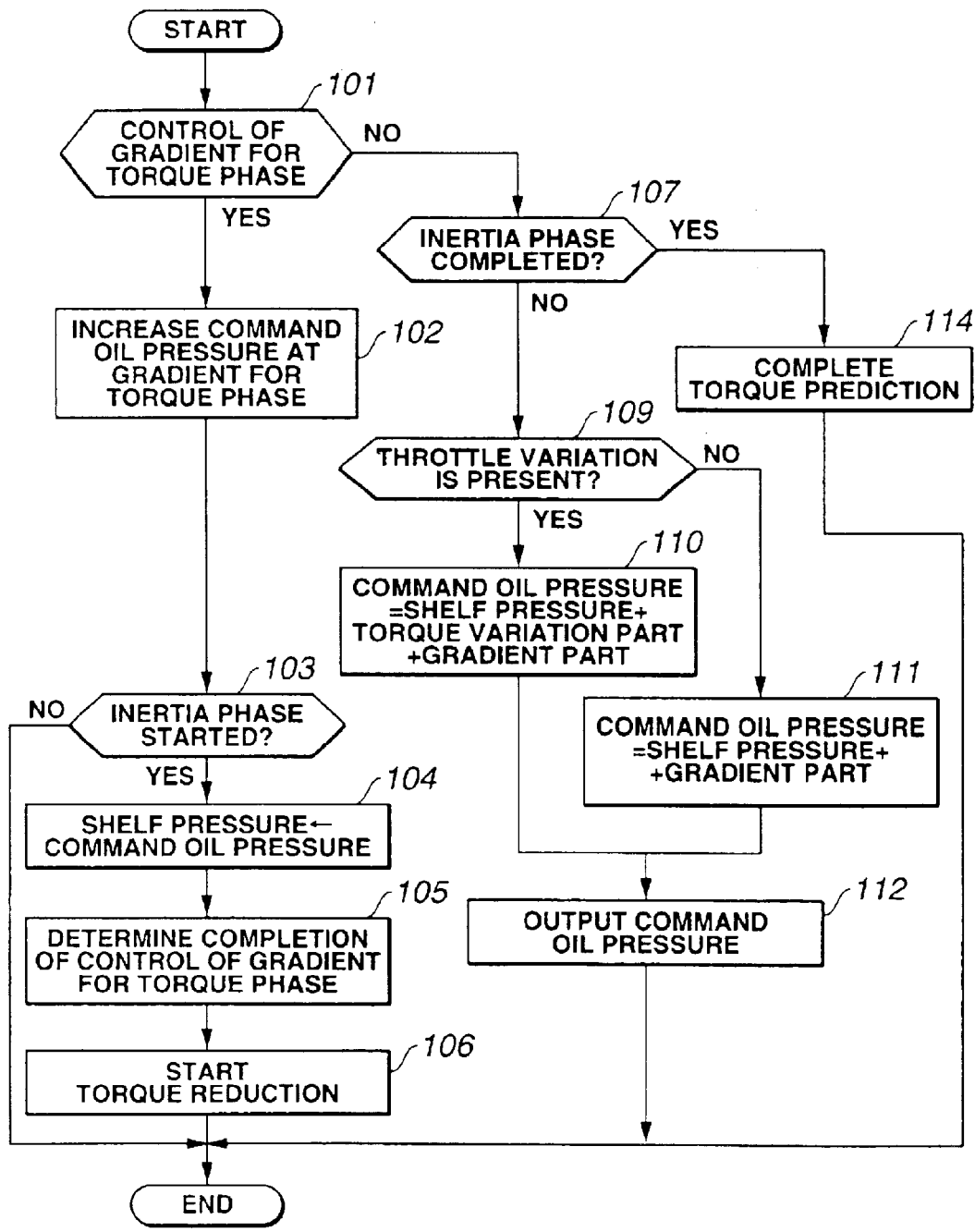
FIG. 5 is a flowchart illustrating engagement-pressure control during upshift in the first embodiment.

FIG. 5 is a flowchart showing flow of shelf-pressure control processing when torque-reduction control during upshift is carried out, which is executed in the A/T control unit 40. The steps are explained below.

At a step 101, it is determined whether or not control of gradient for torque phase for upshift is carried out. If it is under control of gradient for torque phase for upshift, flow proceeds to a step 102. Otherwise, flow proceeds to a step 107.

At the step 102, the command oil pressure is increased at a gradient for torque phase. This gradient for torque phase is a gradient set previously in accordance with the type of shifting and transmission input torque.

At a step 103, it is determined whether or not the inertia phase is started. If the inertia phase is started, flow proceeds to a step 104, whereas if it is not started, the control is finished.

At the step 104, the oil pressure when the inertia phase is detected is set as an initial shelf pressure, wherein a command pressure serves as the initial shelf pressure.

At a step 105, it is carried out determination on completion of control of gradient for torque phase.

At a step 106, a torque reduction is started.

At the step 107, it is determined whether or not the inertia phase is completed. If the inertial phase is completed, flow proceeds to a step 113, whereas if it is not completed, flow proceeds to a step 108.

At a step 109, throttle variation determination is carried out. If it is determined that there is a variation in throttle opening, flow proceeds to a step 110, whereas if it is determined that there is no variation in throttle opening, flow proceeds to a step 111.

In order to prevent occurrence of a shock due to driver's unintentional depression or foot release, unless the throttle opening varies by a predetermined amount as set previously on the increasing side or on the decreasing side with respect to the throttle opening at start of the inertia phase after shift start determination as shown in the time chart, it is determined that driver's unintentional depression or foot release occurs, and that the throttle opening does not vary. The predetermined value is set so that the increasing-side value is smaller than the decreasing-side value. This is because a delayed increase in oil pressure on the increasing side produces zooming of engine rotation or impossible attainment of the gear ratio, i.e. for preventing this.

At the step 110, the command oil pressure is set at an oil pressure obtained by adding a torque variation part oil pressure and a shelf-pressure gradient part oil pressure to the shelf pressure.

Here, the shelf-pressure gradient part oil pressure is previously set in a map for each type of shifting, e.g. turbine revolution at start of the inertia phase and transmission input torque, and it is determined with reference thereto. The shelf-pressure gradient part oil pressure as previously set is preferably set to have a gradient which allows the difference from torque after completing the inertial phase to be minimized. By way of example, since output-shaft torque after completing the inertia phase can previously calculated from the gear ratio of a next speed, transmission input torque, and a revolution constituent (vehicle velocity or turbine revolution) at start of the inertia phase, an increase gradient of the engagement pressure is set to roughly coincide with a gradient connecting to output-shaft torque after completing the inertia phase, i.e. output-shaft torque of a next speed.

The torque variation part oil pressure is an oil pressure corresponding to an increase/decrease part of transmission input torque at throttle variation determination with respect to that at start of the inertia phase, and is calculated, for example, by multiplying transmission input torque by torque-converter torque ratio, which is further multiplied by a predetermined coefficient.

At the step 111, the command oil pressure is set at an oil pressure obtained by adding the shelf-pressure gradient part oil pressure to the initial shelf pressure.

At a step 112, the command oil pressure is output to the solenoids.

At a step 114, a torque reduction is completed.

Figure 6:
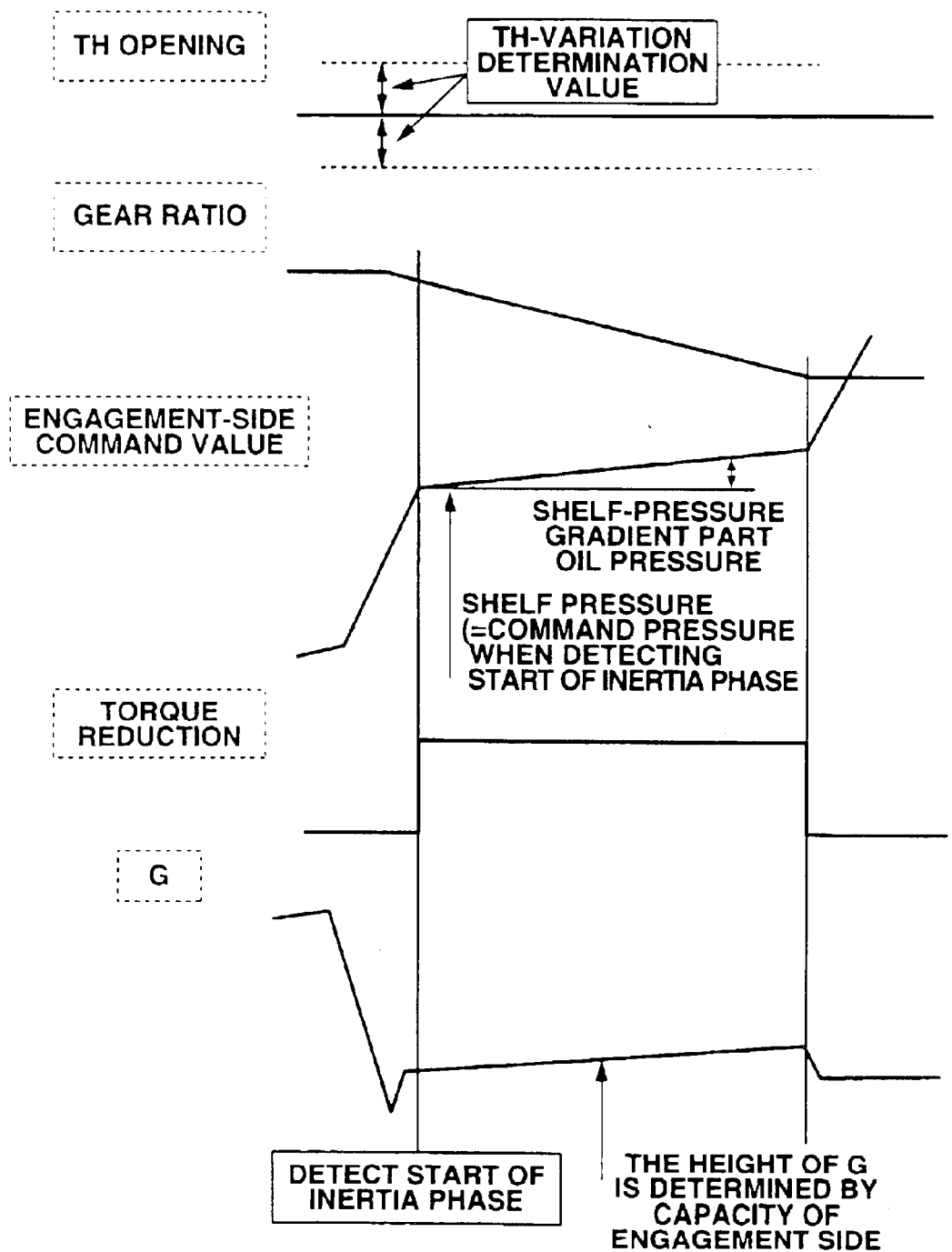
FIG. 6 is a time chart illustrating engagement-pressure control at constant throttle opening during upshift in the first embodiment.
Figure 7:
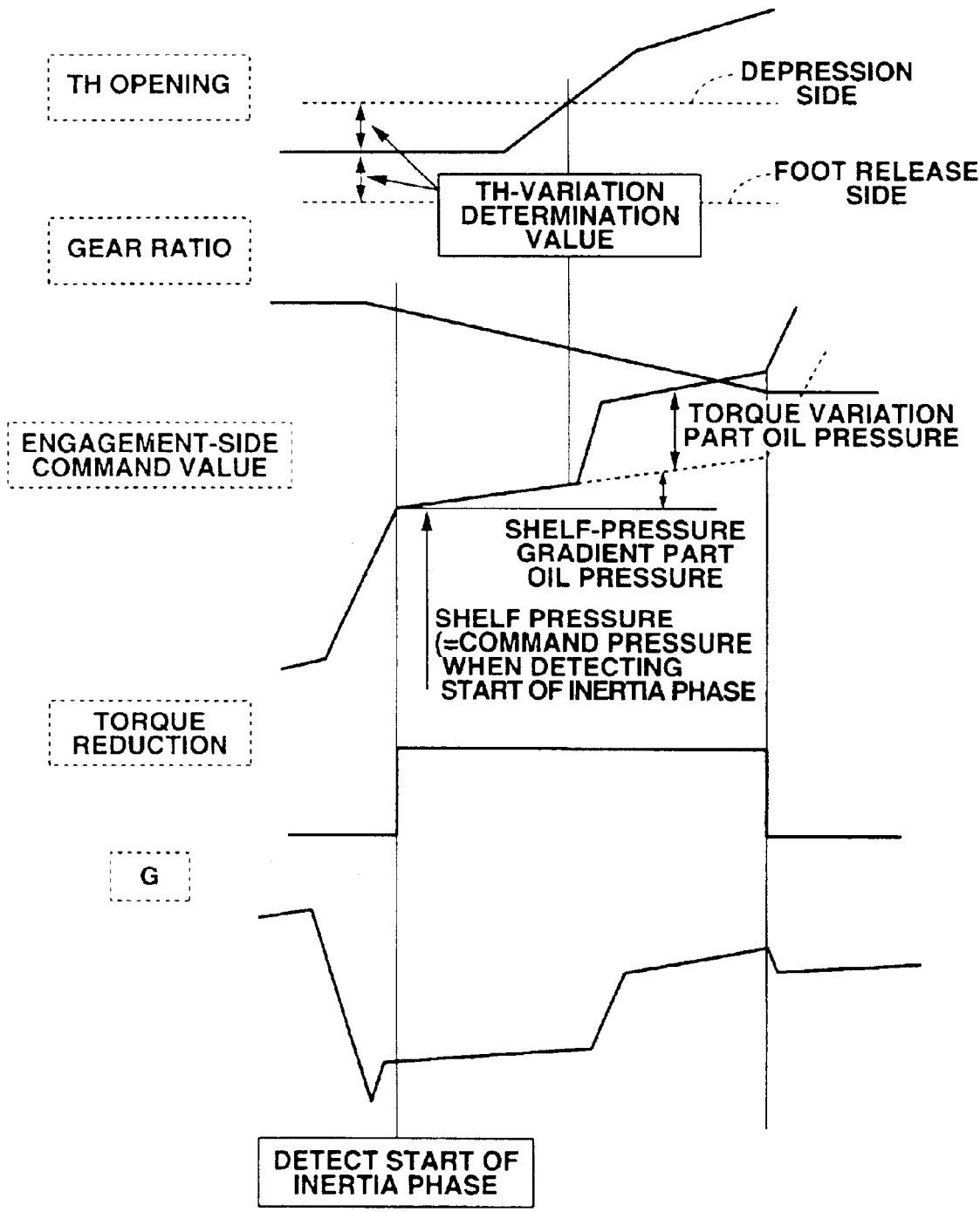
FIG. 7 is a time chart illustrating engagement-pressure control at varied throttle opening (on the depression side) during upshift in the first embodiment.
Figure 8:
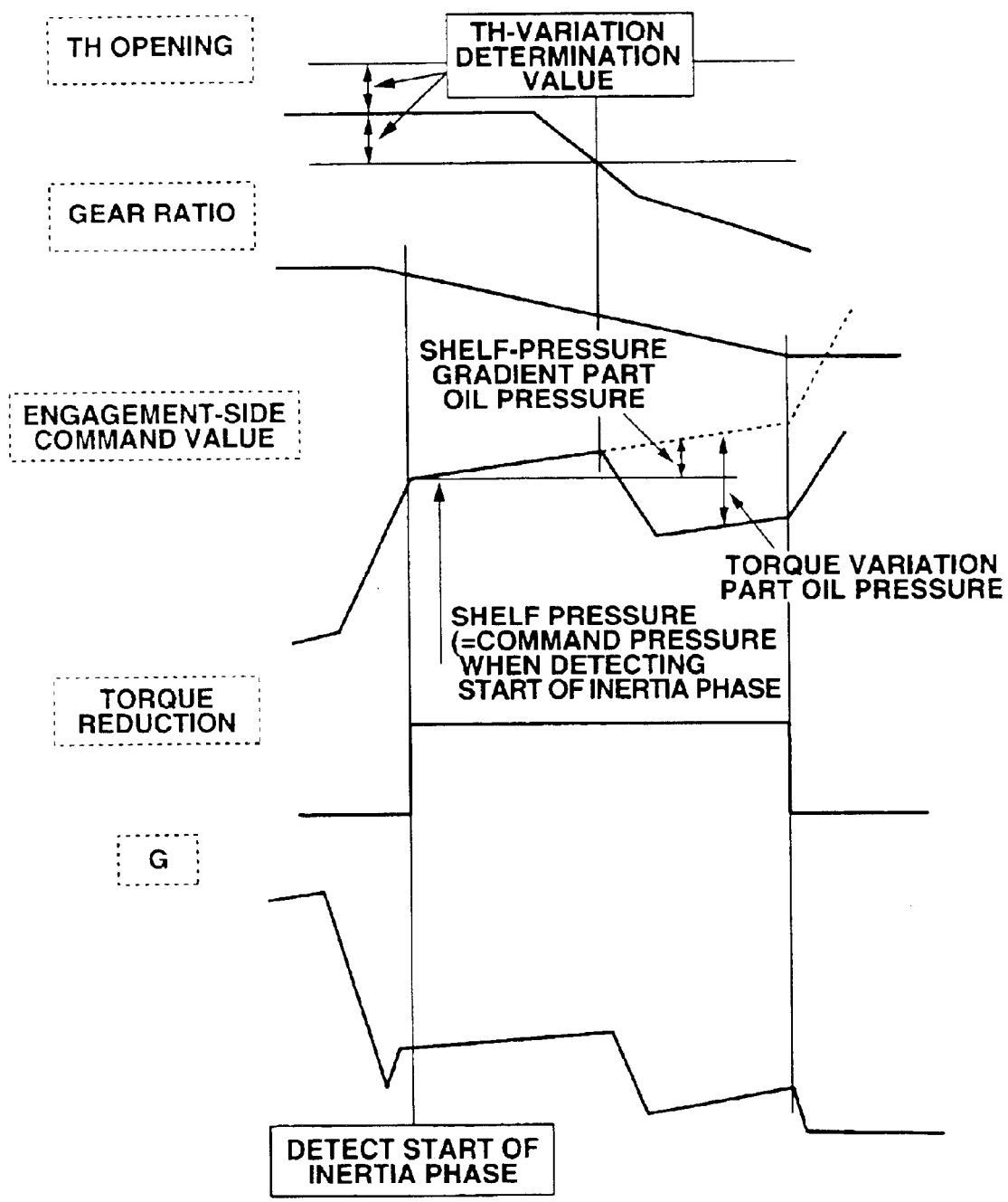
FIG. 8 is a time chart illustrating engagement-pressure control at varied throttle opening (on the foot release side) during upshift in the first embodiment.

FIGS. 6, 7, and 8 are time charts illustrating the throttle opening, gear ratio, engagement-side command pressure, torque-reduction amount, and output-shaft torque when the above shelf-pressure control is carried out. The time charts are explained below.

FIG. 6 is time chart illustrating shelf-pressure control when no throttle variation is present. Specifically, at the step 101 to the step 106, when a shift command is output to start control of gradient for torque phase, the command oil pressure is increased at a gradient for torque phase. With the inertia phase started, the command oil pressure at that point is set as an initial shelf pressure. At this time, a torque reduction is started, the amount of which has a map as previously set in accordance with the type of shifting, and is determined with reference thereto.

At the step 103, it is determined that the inertia phase is started, and at the step 109, it is determined whether or not there is a variation in throttle opening. In FIG. 6, since it is a case where no throttle variation is present, flow proceeds to the step 111 where the oil pressure obtained by adding the shelf-pressure gradient part oil pressure to the initial pressure is output as a command oil pressure. And at the step 107, if it is determined that the inertia phase is completed, a torque reduction is completed, and the control is finished.

FIG. 7 is time chart illustrating shelf-pressure control when a throttle variation is present. Specifically, at the step 101 to the step 106, when a shift command is output to start control of gradient for torque phase, the command oil pressure is increased at a gradient for torque phase. With the inertia phase started, the command oil pressure at that point is set as an initial shelf pressure for outputting, and a torque reduction is started.

At the step 103, it is determined that the inertia phase is started, and at the step 109, it is determined whether or not there is a variation in throttle opening. In FIG. 7, since a variation occurs on the throttle-opening increasing side over a predetermined value as previously set, it is determined that the throttle opening varies, and flow proceeds to the step 110 where the oil pressure obtained by adding the shelf-pressure gradient part oil pressure and the torque variation part oil pressure to the initial shelf pressure is output as a command oil pressure. Here, addition of the torque variation part oil pressure allows achievement of shifting in such a manner that the difference from output-shaft torque after completing the inertia phase at completion of the inertia phase is decreased by increasing the engagement-side command pressure even if the throttle opening is depressed to increase input torque to the transmission and thus input torque to the engagement elements. And at the step 107, if it is determined that the inertia phase is completed, a torque reduction is completed, and the control is finished.

FIG. 8 is a time chart illustrating shelf-pressure control when a throttle variation is present. Specifically, at the step 101 to the step 106, when a shift command is output to start gradient for torque phase, the command oil pressure is increased at a gradient for torque phase. With the inertia phase started, the command oil pressure at that point is set as an initial shelf pressure for outputting, and a torque reduction is started.

At the step 103, it is determined that the inertia phase is started, and at the step 109, it is determined whether or not there is a variation in throttle opening. In FIG. 8, since a variation occurs on the throttle-opening decreasing side over a predetermined value as previously set, it is determined that the throttle opening varies, and flow proceeds to the step 110 where the oil pressure obtained by adding the shelf-pressure gradient part oil pressure and the torque variation part oil pressure to the initial shelf pressure is output as a command oil pressure. In this case, since torque is reduced, the torque variation part oil pressure is a negative value. When this is subtracted, the command oil pressure is decreased in a concretive manner. Here, addition of the torque variation part oil pressure allows achievement of shifting in such a manner that the difference from output-shaft torque after completing the inertia phase at completion of the inertia phase is decreased by decreasing the engagement-side command pressure even if the throttle opening is released to decrease input torque to the transmission and thus input torque to the engagement elements. And at the step 107, if it is determined that the inertia phase is completed, a torque reduction is completed, and the control is finished.

As explained above, with the shift control system for an automatic transmission described in the first embodiment, the engagement pressure at detection of the inertia phase is set as an initial shelf pressure, so that the shelf pressure can be set which allows minimum difference between output-shaft torque at a point that torque is maximally reduced in the torque phase and output-shaft torque after starting the inertia phase while securing progression of the inertia phase through a torque reduction, achieving a restraint of a thrusting shock and the like at start of the inertia phase (effect corresponding to claim 1).

Further, the initial shelf pressure of the friction elements is controlled at an ideal value as described above, and the height of the oil pressure at completion of the inertia phase can be controlled by a shelf-pressure gradient set by input torque at start of the inertia phase, type of shifting, and revolution constituent. Therefore, the difference can be reduced between output-shaft torque determined by the height of the engagement-side shelf pressure immediately before completing the inertia phase and output-shaft torque determined by the gear ratio, input torque, and revolution constituent after shifting immediately after completing the inertia phase, achieving a restraint of occurrence of a shock due to an abrupt reduction in output-shaft torque (effect corresponding to claim 2).

Still further, when it is determined a throttle variation on the throttle-opening increasing side, the torque variation part oil pressure is further added in addition to the initial shelf pressure and the shelf-pressure gradient part oil pressure. When the throttle opening is constant, it is determined that the driver expects constant output-shaft torque, a variation in output-shaft torque is restrained during inertia phase, so that when a driver's acceleration/deceleration requirement occurs even during inertia phase, it is possible to achieve an increase in output-shaft torque in response to this requirement, obtaining reflection of the driver's acceleration/deceleration requirement on output-shaft torque (effect corresponding to claim 3).

Furthermore, since an increasing part with respect to input torque at start of the inertia phase is added or subtracted as torque variation part oil pressure, the difference can surely be reduced between output-shaft torque immediately before completing the inertia phase and output-shaft torque immediately after completing the inertia phase while reflecting a driver's acceleration/deceleration requirement on output-shaft torque (effect corresponding to claim 4).

Further, unless the throttle opening varies by a predetermined amount as set previously on the increasing side or on the decreasing side with respect to the throttle opening at start of the inertia phase, it is determined that driver's unintentional depression or foot release occurs, and that the throttle opening does not vary, allowing prevention of occurrence of a shock due to driver's unintentional depression or foot release. And the predetermined value is set so that the increasing-side value is smaller than the decreasing-side value, allowing sure prevention of zooming of engine rotation or impossible attainment of the gear ratio due to delay of increasing the oil pressure (effect corresponding to claim 5).

Another Embodiment

Having explained the shift control system for an automatic transmission of the present invention in accordance with the first embodiment, the concrete structure is not limited to the first embodiment, and design modification, addition and the like are allowed without departing from the gist of the inventions in claims.

By way of example, the first embodiment shows an example of application to the automatic transmission of 6 forward speeds and 1 reverse speed. Optionally, it is applicable to an automatic transmission having 6 forward speeds similarly, but different structure, or an automatic transmission of 4 forward speeds, 5 forward speeds, 7 forward speeds or the like.

What is claimed is:

1. A shift control system for an automatic transmission provided with shift control means for carrying out shifting by engaging at least one or more friction elements as released when the relationship between a throttle opening of a vehicle and a vehicle speed intersects a shift line of a shift schedule, and torque-reduction control means for temporarily reducing engine torque during a period of shift transition, characterized in that it comprises shift-command determination means for determining whether or not a shift command is output, inertia-phase detection means for detecting start and completion of an inertia phase, and shelf-pressure control means for controlling an engagement pressure of said friction elements, wherein said shelf-pressure control means include means for increasing the engagement pressure of said friction elements at a first gradient as previously set after output of the shift command, wherein after output of the shift command and when start of the inertia phase is detected by said inertia-phase detection means, a torque-reduction command is output to said torque-reduction control means, and the engagement pressure at detection of the inertia phase is set as an initial shelf pressure to increase the shelf pressure at a second gradient as previously set, and wherein after start of the inertia phase and when completion of the inertia phase is detected by said inertia-phase detection means, a torque-reduction completion command is output to said torque-reduction control means, and the engagement pressure of said friction elements is increased up to a predetermined pressure as previously set.

2. The shift control system for an automatic transmission as specified in claim 1, characterized in that said second gradient is determined out of at least transmission input torque and revolution constituent at start of the inertia phase.

3. The shift control system for an automatic transmission as specified in claim 1, characterized in that it comprises throttle-opening detection means for detecting the throttle opening, and throttle-opening variation determination means for determining that the throttle opening varies when the detected throttle opening is increased or decreased by a predetermined value or more with respect to the throttle opening at a predetermined timing after shift start determination, wherein said shelf-pressure control means are provided with an input-torque variation correction part for adding/subtracting a predetermined oil pressure to/from the shelf pressure when the throttle opening is varied by the throttle-opening variation determination means.

4. The shift control system for an automatic transmission as specified in claim 3, characterized in that the predetermined oil pressure added/subtracted by said input-torque variation correction part is an oil pressure set in accordance with a variation part of input torque at a present point with respect to input torque of the automatic transmission at a point that the initial shelf pressure of the engagement pressure is determined.

5. The shift control system for an automatic transmission as specified in claim 3, characterized in that the predetermined amount of a throttle variation is set so that the increasing side has a smaller value than the decreasing side.

6. The shift control system for an automatic transmission as specified in claim 2, characterized in that it comprises throttle-opening detection means for detecting the throttle opening, and throttle-opening variation determination means for determining that the throttle opening varies when the detected throttle opening is increased or decreased by a predetermined value or more with respect to the throttle opening at a predetermined timing after shift start determination, wherein said shelf-pressure control means are provided with an input-torque variation correction part for adding/subtracting a predetermined oil pressure to/from the shelf pressure when the throttle opening is varied by the throttle-opening variation determination means.

7. The shift control system for an automatic transmission as specified in claim 4, characterized in that the predetermined amount of a throttle variation is set so that the increasing side has a smaller value than the decreasing side.

* * * * *